United States Patent [19]

Mills et al.

[11] Patent Number: 4,698,771

[45] Date of Patent: Oct. 6, 1987

[54] ADDER CIRCUIT FOR ENCODED PCM SAMPLES

[75] Inventors: Jeffrey P. Mills, Oak Park; Max S. Macrander, Warrenville, both of Ill.

[73] Assignee: GTE Communication Systems Corporation, Northlake, Ill.

[21] Appl. No.: 687,877

[22] Filed: Dec. 31, 1984

[51] Int. Cl.[4] ........................... G06F 7/50; G06F 7/38
[52] U.S. Cl. .................................... 364/768; 364/748
[58] Field of Search ............................... 364/748, 768

[56] References Cited

U.S. PATENT DOCUMENTS

| | | | |
|---|---|---|---|
| 4,357,674 | 11/1982 | Ikeda et al. | 364/768 |
| 4,511,990 | 4/1985 | Hagiwara et al. | 364/748 |
| 4,612,628 | 9/1986 | Beauchamp et al. | 364/748 |

FOREIGN PATENT DOCUMENTS

| | | | |
|---|---|---|---|
| 0110160 | 6/1984 | European Pat. Off. | 364/748 |
| 54-71912 | 6/1979 | Japan | 364/768 |
| 56-164441 | 12/1981 | Japan | 364/768 |
| 1498400 | 1/1978 | United Kingdom | 364/768 |

OTHER PUBLICATIONS

Dauby et al., "Pulse Code Modulation Adder", *IBM Technical Disclosure Bulletin*, vol. 18, No. 8, pp. 2536–2537, Jan. 1976.

*Primary Examiner*—Gary V. Harkcom
*Assistant Examiner*—Dale M. Shaw
*Attorney, Agent, or Firm*—Charles A. Doktycz; Gregory G. Hendricks; Robert J. Black

[57] ABSTRACT

A circuit adds and subtracts pulse code modulation (PCM) samples in D2 format. An exponent subtractor determines the difference between exponents of the two PCM samples. A mantissa shifter circuit shifts the mantissa portion of a selected PCM sample to compensate for the difference in the exponents. A mantissa adder circuit adds or subtracts the mantissa portion of the shifted and unshifted PCM samples and a sign generator provides a sign value representative of the resultant added or subtracted PCM samples. A normalizer circuit ensures that the mantissa has a predetermined range of values.

10 Claims, 4 Drawing Figures

ADDER CIRCUIT FOR ENCODED PCM SAMPLES

CROSS REFERENCE TO RELATED APPLICATIONS

The present application is related to the following copending and concurrently filed applications:

Ser. No. 687,874 filed Dec. 31, 1984, entitled MULTIPLY/DIVIDE CIRCUIT FOR ENCODED PCM SAMPLES Ser. No. 687,875 filed Dec. 31, 1984, entitled MULTIPLIER CIRCUIT FOR ENCODED PCM SAMPLES Ser. No. 687,892 filed Dec. 31, 1984, entitled DIVIDER CIRCUIT FOR ENCODED PCM SAMPLES All of these inventions were invented by the same inventors and assigned to the same assignee.

FIELD OF THE INVENTION

The present invention relates to PCM signal processing circuitry and more particularly to a circuit for adding D2 encoded PCM samples.

BACKGROUND OF THE INVENTION

Prior art techniques for adding D2 encoded PCM samples require conversion of the eight bit D2 encoded PCM sample into a thirteen bit linear coded sample. These samples are then added or subtracted, depending upon their respective sign bits, and the resultant value is then reconverted to an eight bit D2 encoded number.

The present invention discloses a novel arrangement for performing numerical operations directly on the D2 encoded PCM samples without the requirement of first converting them to linear code and then reconverting the results of the numerical operation back to D2 code. Under the present invention, the D2 encoded PCM samples are interpreted to be in the form of floating point numbers. After the numerical operations have been performed the resultant number is normalized to account for an implied magnitude bit.

SUMMARY OF THE INVENTION

In accordance with the present invention an adder circuit is provided for use in a digital signal processing system directly on PCM samples, which includes a source of pulse code modulation (PCM) samples, each sample having sign, exponent and mantissa fields. The adder circuit includes an exponent subtractor circuit, connected to the source of PCM samples, and operative to select one of the exponents from a pair of PCM samples, to provide signals representative of the difference in values of the exponents, and to provide signals identifying the selected exponent.

A mantissa shifter circuit is also included and it is connected to the source of PCM samples and to the exponent subtractor circuit. This shifter is operative in response to the signals identifying the selected exponent to shift the associated mantissa by a number of bit positions equal to the difference in exponent values, whereby the mantissa of one sample is adjusted to reflect an exponent of the same value as the other sample.

A mantissa adder circuit is also included and it is connected to the source of PCM samples and to the mantissa shifter circuit. The mantissa adder circuit is operative in response to sign bits of different values from the pair of PCM samples to provide a difference signal representative of the difference between the shifted mantissa and the mantissa associated with the unselected exponent.

It is further operative in response to sign bits of the same value from the pair of PCM samples to provide a summation signal representative of the sum of the shifted mantissa and the mantissa associated with the unselected exponent.

A sign bit generator is also included and it is connected to the source of PCM samples and the mantissa adder circuit. The sign bit generator is operative in response to said sign bits of the PCM samples and the difference or summation signals to provide a sign bit representative of the sign of the difference or summation signals.

DESCRIPTION OF THE PREFERRED EMBODIMENT

Figure 1:
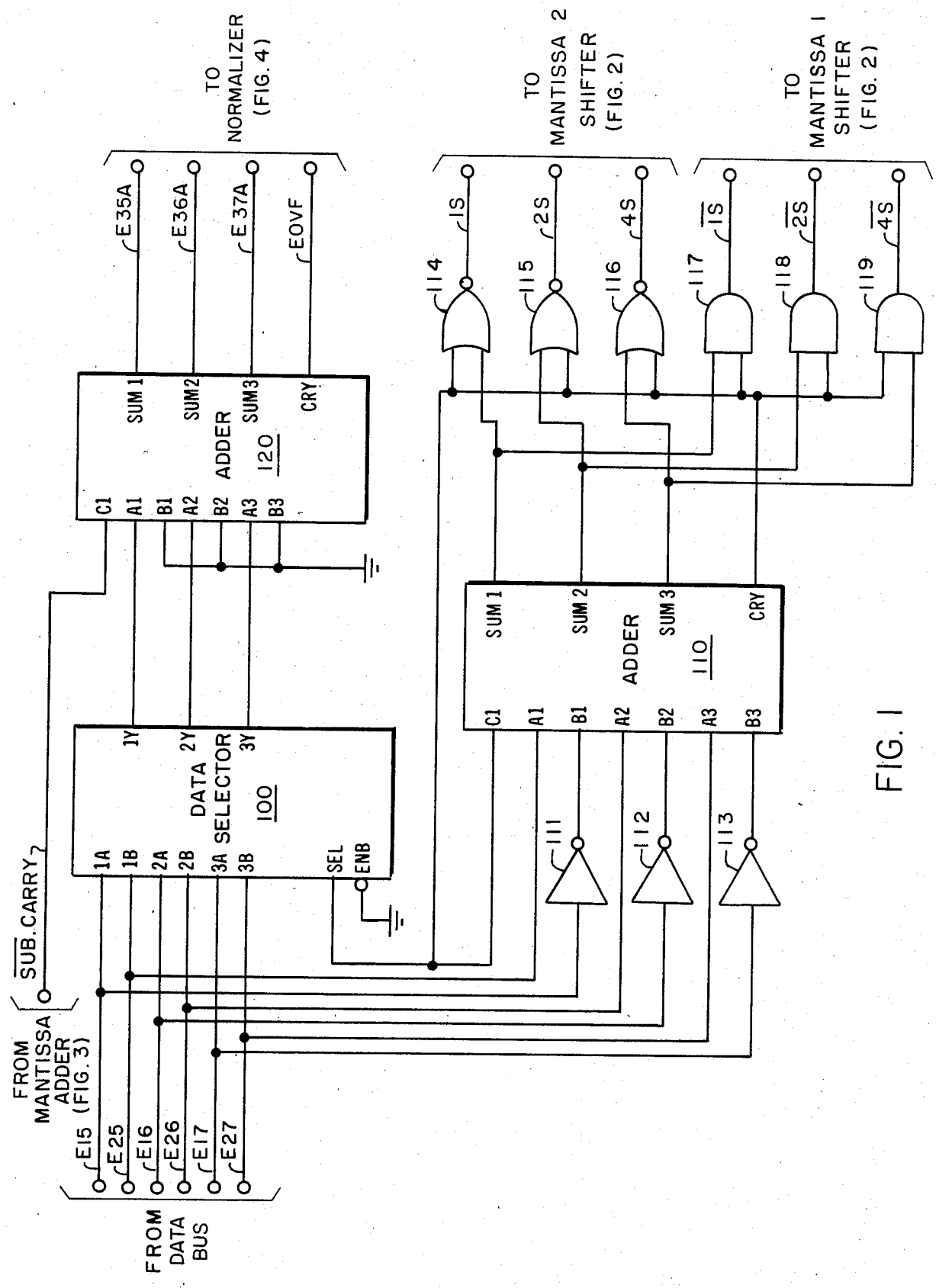
FIG. 1 of the accompanying drawing is a logic diagram of the exponent subtractor and selector circuit of the present invention.

The circuit disclosed in the present invention operates directly on the D2 formatted samples without the need for conversion to linear code and reconversion to D2 code. In the D2 formatted "mu" law compressed code, bit positions have the following significance:

| SIGN | SEGMENT BITS | MAGNITUDE BITS |
|---|---|---|
| ± | S1 S2 S3 | M4 M3 M2 M1 |

The three segment bits are used to indicate which of the eight possible segments contains the "mu" law encoded sample. The four magnitude bits are used to indicate one of the sixteen equally spaced locations within a particular segment. Magnitude bits M4–M1 are assigned weights of $2^{-1}$-$2^{-4}$. A fifth magnitude bit having the weight of $(2^0)$ is always implied and therefore it is not included in the D2 code. For example, the number 11011010 is negative (1 in the sign bit position) and is located in the fifth segment (101 in the segment bit position) and in the tenth position (1010 in the magnitude bits) of that segment.

However, this number may be equally well interpreted as being a binary floating point number having a negative value (1 in the sign bit position) an exponent represented by segment bits 101 and a mantissa represented by magnitude bits 1010. These mantissa bits are similarly weighted from $2^{-1}$ to $2^{-4}$. With this arrangement the floating point number has a value of $K \times 2^{-5} \times (1 + \frac{1}{2} + \frac{1}{8})$ volts, where the mantissa value of 1 is defined as an implied bit, the mantissa value of $\frac{1}{2}$ is represented by the first bit of the mantissa (first nonzero bit) as weighted by $2^{-1}$ and the mantissa value of $\frac{1}{8}$ is equal to the third bit of the mantissa (second nonzero bit) as weighted by $2^{-3}$. The K factor determines the maximum value of the sample but is has no effect on the numerical floating point operations since all numbers have equal K factors in this application. Typically, K=1.

The two D2 encoded samples that are operated on by the present invention, are referred to as Word #1 and Word #2. The bits of Word #1 are referenced as S1, sign bit, E17, E16, and E15, exponent bits, and M14, M13, M12 and M11, mantissa bits. The bits of Word #2 are referenced as S2, sign bit, E27, E26, and E25, exponent bits, and M24, M23, M22 and M21, mantissa bits. Similarly, the output word provided by the present invention is referred to as Word #3 and has corresponding bit notations of S3, sign bit, E37, E36 and E35, exponent bits, and M34, M33, M32 and M31, mantissa bits.

When adding or subtracting D2 encoded samples, rules similar to those of floating point addition or subtraction are applied. Therefore, the exponents are first equalized. The largest exponent is then selected for the output exponent E35–E37. Consequently the mantissa of the number with the smallest exponent is shifted down (divided by a power of 2) by a number of places equal to the difference in the exponents of the two D2 encoded samples. This mantissa must be shifted down since its corresponding exponent is, in effect, shifted up to equal that of the larger exponent.

Depending on the value of the sign bits, S1 and S2, the mantissa's, M11–M15 and M21–M25, are subsequently added or subtracted. If the sign bits are of equal value the mantissas are added. To be expressable in the format discussed herein, the resultant mantissa, M31A–M35A, must be greater than or equal to 1 and less than 2. Therefore, if the resultant mantissa, M31A–M35A, is greater than or equal to 2, a carry bit is generated. This bit is added to the exponent, E35–E37, causing the exponent to increase by 1. Also, in that case, the resultant mantissa, M31A–M35A, is shifted down by 1 bit position, causing the result to be expressable. If the exponent, E35–E37, then overflows, the maximum number (all ones in all bit positions except the sign bit) is generated.

If the sign bits of Words #1 and #2 are unequal, then a subtraction operation occurs. If the resulting mantissa, M31A–M35A, becomes denormalized (i.e. less than 1), a particular number (N) of up or left shifts of the resultant mantissa, M31A–M35A, are performed until this mantissa is greater than or equal to 1 and less than 2. Consequently, a corresponding number (N) must be subtracted from the exponent, E35–E37. If the resultant exponent, E35–E37, becomes less than zero (i.e. underflows), then the minimum number is generated in all positions except for the sign bit.

Referring now to FIG. 1 the exponent subtractor circuit is shown connected between the CPU, the mantissa adder, the normalizer and the mantissa shifter circuits. Data selector 100 includes inputs 1A, 2A and 3A which are connected to the data bus via leads E15, E16 and E17, respecively. Similarly inputs 1B, 2B and 3B are connected to the data bus via leads E25, E26 and E27, respectively.

Adder 110 includes inputs A1, A2 and A3 which are connected to the data bus via leads E25, E26 and E27, respectively. This adder also includes inputs B1, B2 and B3 which are connected to inverters 111, 112 and 113, respectively. These inverters are further connected to the data bus via leads E15, E16 and E17, respectively. Adder 120 includes inputs A1, A2 and A3 which are connected to outputs 1Y, 2Y and 3Y of data selector 100, respectively. Inputs B1, B2 and B3 of adder 120 are connected to ground and input C1 is connected to the mantissa adder via the SUB. CARRY lead. Outputs SUM1, SUM2, SUM3 and CRY of adder 120 are connected to the normalizer via leads E35, E36, E37 and EOVF.

Similarly outputs SUM1, SUM2 and SUM3 of adder 110 are connected to OR gates 114, 115 and 116, respectively. Output CRY of this adder is also connected to each of these OR gates, to the carry (C1) input of adder 110, to the select (SEL) input of data selector 100 and to AND gates 117, 118 and 119. OR gates 114, 115 and 116 are connected to the mantissa 2 shifter via leads 1S, 2S and 4S, respectively. Similarly, AND gates 117, 118 and 209 are connected to the mantissa 1 shifter via leads 1S, 2S and 4S, respectively.

The exponent subtractor circuit determines the difference between the exponents of Words #1 and #2. This circuit then selects the word with the larger exponent. In this particular circuit, subtraction is accomplished through use of one's-complement addition, although other methods of subtraction could be used. To obtain the one's complement of the 3 bit exponent of Word #1 these bits are inverted by inverters 201–203. These inverted bits then appear at inputs B1–B3, respectively, of adder 110. The noninverted exponent bits of Word #2, E25–E27, appear at inputs, A1–A3, respectively, of adder 110.

Adder 110 then adds the numbers appearing at its A1–A3 inputs to those appearing at its B1–B3 inputs. If a carry condition occurs, i.e. a logic level 1 signal appears at the carry (CRY) output, then the difference between exponent 2, E27–E25, and exponent 1, E17–E15, is greater than zero. Since these exponents each have 3 bit positions this difference could range between values of zero and seven. When a carry condition does occur, the logic level 1 signal from the CRY output of adder 110 is applied to the select (SEL) input of data selector 100. This logic level 1 signal also appears at the carry (C1) input of adder 110 to properly complete the subtraction operation through one's-complement addition. Thus the output signals appearing on the SUM1-SUM3 and CRY outputs represent the result of this one's-complement form of subtraction.

The Word #1 exponents, E15–E17 also appear at data selector 100 inputs 1A–3A, and the Word #2 exponent bits, E25–E27, also appear at data selector 100 inputs 1B–3B. However, since a logic level 1 signal appears at the select (SEL) input of data selector 100, the signals appearing at inputs 1B–3B are gated to outputs 1Y–3Y, respectively. These signals then appear at inputs A1–A3, of adder 120. Thus, the exponent bits of Word #2, E25–E27, are selected by data selector 100 when the Word #2 exponent is greater than the Word #1 exponent.

Similarly, if a carry condition does not occur, the exponent bits of Word #2 are less than or equal to those of Word #1. Therefore, a logic level 0 signal appears at the CRY output of adder 110. This logic level 0 signal then appears at the select (SEL) input of data selector 100 causing it to select the exponent bits of Word #1, E15–E17. These exponent bits then appear at outputs 1Y–3Y and therefore at inputs A1–A3 of adder 120.

If a carry condition results from addition of the mantissas of the two D2 encoded words and this condition occurs during an addition, rather than a subtraction operation, then a logic level 1 signal appears on the SUB. CARRY lead. This signal then appears at the C1 input of adder 120 which adds it to the selected exponent bits appearing at its A1–A3 inputs. Thus, if a carry condition occurs during the addition of the mantissa bits, adder 120 increases the value of the selected exponent bits by a value of 1. However, if adder 120 then also generates a carry condition, then a logic level 1 exponent overflow (EOVF) signal is provided at its carry (CRY) output.

If a carry condition does occur when the exponent bits of Word #1 are subtracted from Word #2 by adder 110, then the mantissa bits of Word #1 must be shifted a number of bits represented by the difference in magnitude of the exponents. If a carry condition does not occur, when the exponent bits of Word #1 are subtracted from those of Word #2 by adder 110, then the mantissa levels of Word #2 must be shifted instead. In either case the difference is represented by the signals appearing at the SUM1–SUM3 outputs of adder 110. These signals appear at the inputs of NOR gates 114–116, respectively, and AND gates 117–119, respectively. The signal appearing at the carry (CRY) output of adder 110 also appears at gates 114–119. Consequently, when a logic level 0 signal appears at this output (no carry condition), AND gates 117–119 then provide a logic level 0 signal on the $\overline{1S}$, $\overline{2S}$, and $\overline{4S}$ leads. However, NOR gates 114–116 provide signals on the 1S, 2S and 4S leads representative of the values appearing at the SUM1, SUM2 and SUM3 outputs of adder 110. These values represent the number of down shifts required for the mantissa bits of Word #2, including the implied bit, M21–M25.

When a carry condition does occur and a logic level 1 signal appears at the CRY output of adder 110, then NOR gates 114–116 provide logic level 0 signals on the 1S, 2S and 4S leads. However, AND gates 117–119 are then enabled by this logic level 1 signal and they provide signals on leads $\overline{1S}$, $\overline{2S}$ and $\overline{4S}$, representative of the signals appering at the SUM1, SUM2, and SUM3 outputs of adder 110. These signals represent the number of down shifts required for the mantissa bits of Word #1, including the implied bit, M11–M15.

Figure 2:
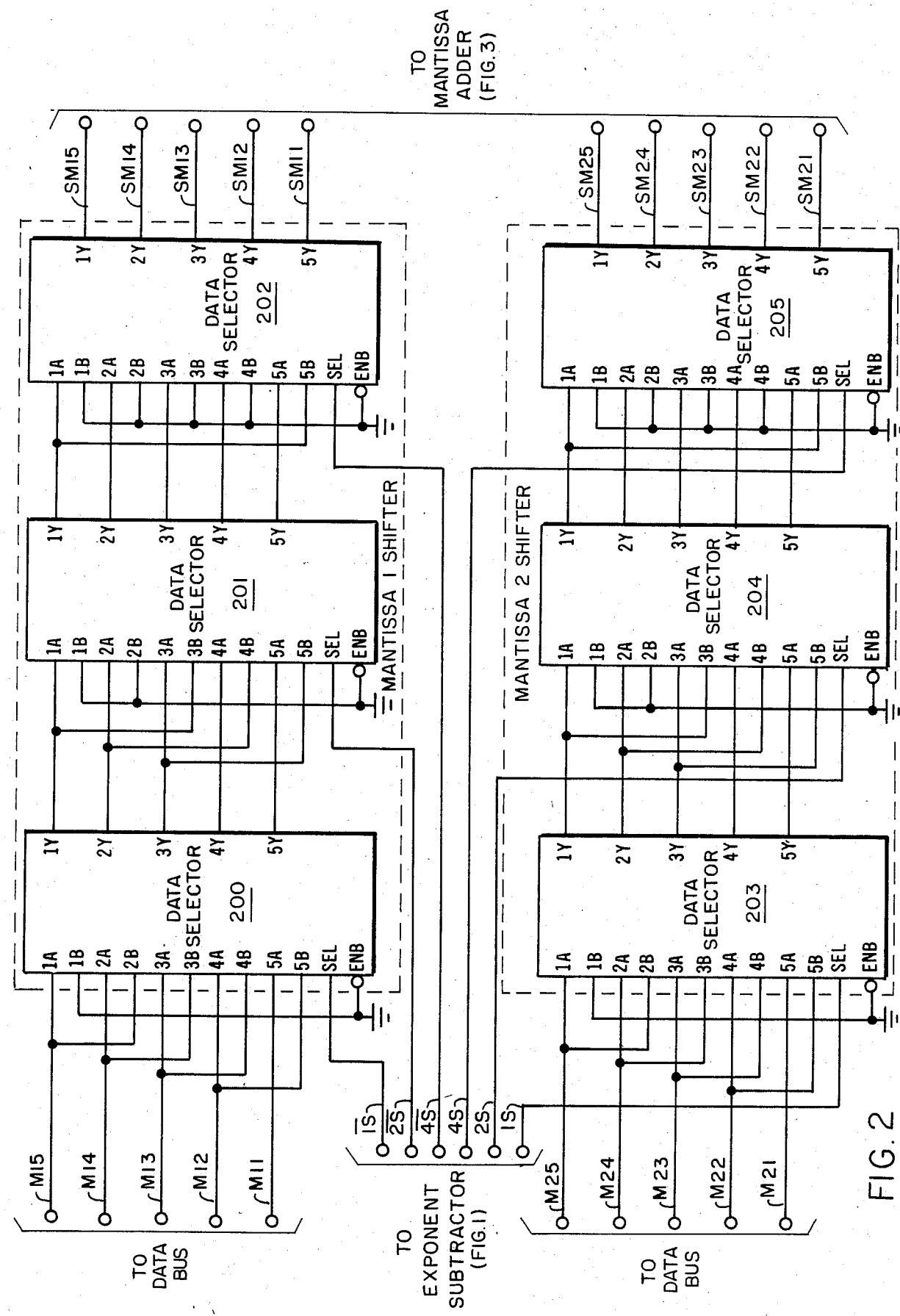
FIG. 2 of the accompanying drawing is a logic diagram of the mantissa shifter circuits of the present invention.

Referring now to FIG. 2 the mantissa 1 and mantissa 2 shifter circuits of the present invention are shown. The mantissa 1 shifter includes data selectors 200, 201 and 202. Data selector 200 includes inputs 1A, 2A, 3A, 4A and 5A which are connected to the data but via leads M15, M14, M13, M12 and M11, respectively. Data selector 200 also includes input 1B which is connected to ground and inputs 2B, 3B, 4B and 5B which are connected to the data bus via leads M15, M14, M13 and M12, respectively. The select (SEL) input of this data selector is connected to the exponent subtractor via lead $\overline{1S}$.

Data selector 201 includes inputs 1A, 2A, 3A, 4A, and 5A which are connected to outputs 1Y, 2Y, 3Y, 4Y and 5Y respectively, of data selector 200. Inputs 1B and 2B of this data selector are connected to ground while inputs 3B, 4B and 5B are connected to outputs 1Y, 2Y and 3Y, respectively, of data selector 200. The select (SEL) input of this data selector is connected to the exponent subtractor via lead $\overline{2S}$.

Data selector 202 includes inputs 1A, 2A, 3A, 4A and 5A which are connected to outputs 1Y, 2Y, 3Y, 4Y and 5Y, respectively, of data selector 201. Inputs 1B, 2B, 3B and 4B of data selector 202 are connected to ground while input 5B is connected to output 1Y of data selector 201. The select (SEL) input of this data selector is connected to the exponent subtractor via lead $\overline{4S}$. Outputs 1Y, 2Y, 3Y, 4Y and 5Y of data selector 202 are connected to the mantissa adder via leads SM15, SM14, SM13, SM12 and SM11, respectively. The mantissa 2 shifter is similarly connected between the data bus, the exponent subtractor and the mantissa adder.

The signals on the $\overline{1S}$, $\overline{2S}$ and $\overline{4S}$ leads appear at the select (SEL) inputs of data selectors 200, 201 and 202. Thus, as was described with reference to the exponent subtractor, these signals cause the mantissa bits of Word #1 to be shifted down when the exponent of Word #2 is greater than the exponent of Word #1. Such down shifting is required since the larger exponent value of Word #2 is then selected for the resultant exponent. Similarly, the signals appearing on leads 1S, 2S and 4S, appear at the select (SEL) inputs of data selectors 203, 204 and 205, respectively. These signals cause the mantissa bits of Word #2 to be shifted down when the exponent of Word #1 is greater than the exponent of Word #2.

Mantissa shifters 1 and 2 consist of 3 stage data selectors, 200–202, and 203–205, respectively. The first stage of each shifter produces 1 shift, the second stage of each shifter produces 2 shifts and the third stage of each shifter produces 4 shifts. These shifts occur when a logic level 1 signal appears at the select (SEL) input of the corresponding data selector stage. These data selectors perform their shifting operations by selecting the 1B–5B inputs and gating them to their 1Y–5Y outputs.

The mantissa bits are connected to the corresponding level A inputs of the data selectors, and also to the lower order level B inputs of these data selectors. For instance, bit M15 is connected to input 1A of data selector 200 but it is also connected to input 2B of this data selector. Consequently, when a logic level 1 signal appears at the select (SEL) input of data selector 200, bit M15 appears at the 2Y output. Thus, this bit is shifted since it would otherwise appear at the 1Y output, if a logic level 0 signal were applied to the select (SEL) input. The remaining mantissa bits are similarly connected to the B inputs of data selector 200 at a level that is one order lower than the A inputs. Under this shifting arrangement, bit M15 is shifted from the first bit to the second bit. Consequently, a logic level 0 signal appears at the first bit since input 1B is connected to ground.

Similarly, the 1Y output of data selector 200 is connected to the third order (3B) input of data selector 201. This results in a two bit shift when a logic level 1 signal appears at the select (SEL) input of data selector 201. Third stage data selector 202 is arranged in a similar manner and it produces a 4 bit shift since the 1Y output of data selector 201 is connected to the 5B input of data selector 202. Consequently, the 1B–4B inputs of this data selector are connected to ground. The total shift is equal to the binary number represented by outputs $\overline{1S}$, $\overline{2S}$ and $\overline{4S}$.

The data selectors of the mantissa 2 shifter are similarly arranged to provide 1, 2 and 4 bit shifts of the mantissa bits of word #2. Such a shifting occurs whenever a logic level 1 signal appears at their select (SEL) inputs. When the select inputs of these data selectors are at logic level 0 the 1A–5A inputs are gated to the 1Y–5Y outputs. Under this condition the mantissa bits are not shifted since they are associated with the larger exponent. Thus, the mantissa 1 and 2 shifters provide shifted or gated (nonshifted) mantissa bit signals on leads SM15–SM11, and SM25–SM21, respectively, depending on the signal appearing at their select inputs. The total shift is equal to the binary number represented by outputs 1S, 2S and 4S.

Figure 3:
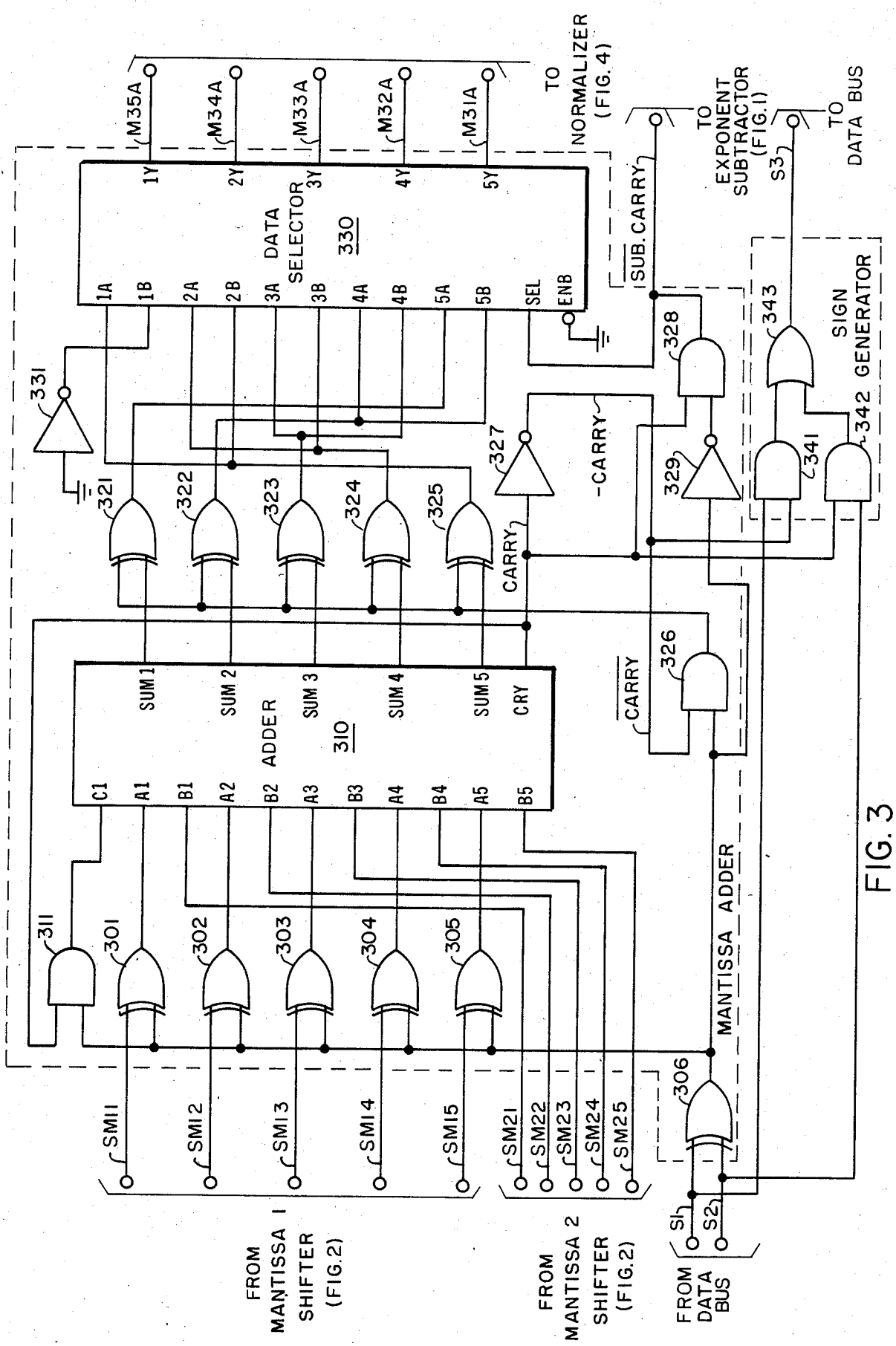
FIG. 3 of the accompanying drawing is a logic diagram of the mantissa and sign generator circuits of the present invention.

Referring now to FIG. 3 the mantissa adder and sign generator of the present invention are shown. The mantissa adder includes exclusive-OR gates 301–305 which are connected to the mantissa 1 shifter via leads SM11–SM15, respectively. These exclusive-OR gates are also connected to exclusive-OR gate 306 which is connected to the data bus via leads S1 and S2. Adder 310 includes carry input C1 which is connected to AND gate 311. Adder 310 also includes inputs A1–A5 which are connected to exclusive-OR gates 301–305, respectively. This adder also includes inputs B1–B5 which are connected to the mantissa 2 shifter via leads SM21–SM25, respectively. AND gate 311 is connected to exclusive-OR gate 306 and the carry (CRY) output of adder 310. This adder further includes outputs SUM-1–SUM5 which are connected to exclusive-OR gates 321–325, respectively. These exclusive-OR gates are also connected to AND gate 326 which is connected to exclusive-OR gate 306 and inverter 327. This inverter is further connected to the carry (CRY) output of adder 310. AND gate 328 is also connected to the carry (CRY) output of adder 310 and to inverter 329 which is connected to exclusive-OR gate 306.

Data selector 330 includes inputs 1A–5A which are connected to exclusive-OR gates 325–321, respectively. This data selector also includes input 1B which is connected to ground via inverter 331 and inputs 2B–5B which are connected to exclusive-OR gates 325–322, respectively. The select (SEL) input of this data selector is connected to AND gate 328. Outputs 1Y–5Y of data selector 330 are connected to the normalizer via leads M35A–M31A, respectively, and AND gate 328 is connected to the exponent subtractor via the SUB. CARRY lead.

The shifted mantissa bits for Word #1 appear at exclusive-OR gates 301–305 via leads SM11–SM15. However, the shifted mantissa bits for Word #2 appear at the B1–B5 inputs of adder 310 via the SM21–SM25 leads. Also, the sign bits for Word #1 and #2 appear at the inputs of exclusive-OR gate 306 via the S1 and S2 inputs, respectively. The mantissa adder circuit adds the shifted (zero or more shifts) mantissa of one word to the nonshifted mantissa of the other. Alternatively, it subtracts the shifted (zero or more shifts) or nonshifted mantissa of Word #1 from the nonshifted or shifted (zero or more shifts) mantissa of Word #2, respectively. Such subtraction is done by means of one's complement addition, although other means of subtraction could be used.

If addition is to take place, the sign bits, S1 and S2, are either both positive or both negative. In such cases, exclusive-OR gate 306 provides a logic level 0 signal since both of its inputs have the same sign value. Consequently, exclusive-OR gates 301–305 pass the shifted or nonshifted mantissa bits of Word #1, SM11–SM15, directly to the A1–A5 inputs, respectively, of adder 310. This adder then adds these signals to the shifted or nonshifted mantissa bits of Word #2 which appear at the B1–B5 inputs of adder 310 via the SM21–SM25 leads.

However, if subtraction is to occur, the sign bits have different values. In this case, exclusive-OR gate 306 applies a logic level 1 signal to the second input of exclusive-OR gates 301–305 and also to the second input of AND gate 311. The mantissa bits of Word #1 appearing on the SM11–SM15 leads are then inverted by exclusive-OR gates 301–305 and these inverted signals are applied to the A1–A5 inputs of adder circuit 310. This adder circuit then adds the inverted mantissa bits of Word #1 to those of Word #2 which appear at the B1–B5 inputs via the SM21–SM25 leads. The CARRY signal, when at logic level 1 is then gated by AND gate 311 to the C1 input of adder 310 where it is added toether with the mantissas of Words #1 and #2, as required for subtraction through one's-complement addition. The output must be in signed-magnitude form.

This requires that the output signals be inverted when negative, i.e., when no carry condition occurs. Such a condition results when the mantissa of Word #1 is greater than the mantissa of Word #2 and the mantissa of Word #1 is subtracted from the mantissa of Word #2. The mantissa adder circuit employs a predeterined subtraction arrangement whereby the mantissa bits of Word #1 are always subtracted from the mantissa bits of Word #2. The sign bit is adjusted by the sign generator to account for situations where Word #2 is negative and Word #1 is positive which would indicate exclusive-OR gate 306 provides a logic level 0 signal since both of its inputs have the same sign value. Consequently, exclusive-OR gates 301–305 pass the shifted or nonshifted mantissa bits of Word #1, SM11–SM15, directly to the A1–A5 inputs, respectively, of adder 310. This adder then adds these signals to the shifted or nonshifted mantissa bits of Word #2 which appear at the B1–B5 inputs of adder 310 via the SM21–SM25 leads.

However, if subtraction is to occur, the sign bits have different values. In this case, exclusive-OR gate 306 applies a logic level 1 signal to the second input of exclusive-OR gates 301–305 and also to the second input of AND gate 311. The mantissa bits of Word #1 appearing on the SM11–SM15 leads are then inverted by exclusive-OR gates 301–305 and these inverted signals are applied to the A1–A5 inputs of adder circuit 310. This adder circuit then adds the inverted mantissa bits of Word #1 to those of Word #2 which appear at the B1–B5 inputs via the SM21–SM25 leads. The CARRY signal, when at logic level 1 is then gated by AND gate 311 to the C1 input of adder 310 where it is added toether with the mantissas of Words #1 and #2, as required for subtraction through one's-complement addition. The output must be in signed-magnitude form.

This requires that the output signals be inverted when negative, i.e., when no carry condition occurs. Such a condition results when the mantissa of Word #1 is greater than the mantissa of Word #2 and the mantissa of Word #1 is subtracted from the mantissa of Word #2. The mantissa adder circuit employs a predetermined subtraction arrangement whereby the mantissa bits of Word #1 are always subtracted from the mantissa bits of Word #2. The sign bit is adjusted by the sign generator to account for situations where Word #2 is negative and Word #1 is positive which would indicate a carry condition does not occur during a subtraction operation. These inverted signals are then applied to the 5A–1A inputs of data selector 330.

If a carry condition occurs during addition, then the resultant mantissa overflows since it is greater than or equal to a value of 2. Under these conditions a value of 1 must be added to the exponent and the five bit mantissa must be shifted down by one position. Also, a value of 1 must be shifted into the implied bit position. During an addition operation the sign bits S1 and S2 have the same value. Consequently, exclusive-OR gate 306 provides a logic level 0 signal which appears at the input of inverter 329. This inverter then applies a logic level 1 signal to the second input of AND gate 328. The first input of this AND gate is connected to the carry (CRY) output of adder 310. Consequently, AND gate 328 provides a logic level 1 signal to the $\overline{SUB}$. CARRY lead when a carry condition occurs during an addition operation. This logic level 1 signal causes the exponent to be incremented since it is applied to the carry (C1) input of adder 120 (FIG. 1) via the $\overline{SUB}$. CARRY lead.

Also, a logic level 1 signal must be shifted into the implied bit position and the mantissa bits must be shifted down by one bit. Data selector 330 does such implied bit insertion and shifting, in response to a logic level 1 signal appearing at its select (SEL) input via the $\overline{SUB}$. CARRY lead. Data selector 330 then provides the shifted mantissa bits at outputs 1Y-5Y. These bits M35A-M31A then appear at the inputs of the normalizer circuit shown in FIG. 4.

In the event that a carry condition does not occur, a logic level 0 signal is provided on the $\overline{SUB}$. CARRY lead. This logic level 0 signal then appears at the select (SEL) input of data selector 330 which then gates the outputs of exclusive-OR gates 321-325 directly to outputs 5Y-1Y, respectively. The signals of these outputs also appear at the normalizer circuit of FIG. 4. When a carry condition occurs during an addition operation, a logic level 1 signal is shifted into the M35A bit position as provided by inverter 331 which is connected to ground.

The sign generator includes both AND gate 341 which is connected to inverter 327 via the CARRY lead, and AND gate 342 which is connected to the carry (CRY) output of adder 310. AND gates 341 and 342 are also connected to the data bus via sign leads, S1 and S2, respectively. The outputs of these AND gates are connected to OR gate 343 which is then connected to the data bus via sign lead S3.

The sign generator determines the value of the sign bit, S3, of the output word. If the sign bit of Word #1 is positive (S1=0), the sign bit of Word #2 is negative (S2=1), and there is no carry condition, then (Word #3) is positive (S3=0). An example of such conditions is when Word #1 has a value of 5 and Word #2 has a value of −4. Then the resultant word (Word #3) has a value of +1.

Another possible situation occurs when the sign bit of Word #1 is positive (S1=0), the sign bit of Word #2 is negative (S2=1) and a carry condition does occur. Under these conditions the sign bit of Word #3 is negative (S3=1). An example of such conditions occurs when Word #1 has a value of 4, Word #2 has a value of −5 and the resultant word (Word #3) has a value of −1.

A third possible situation is when the sign bit of Word #1 is negative (S1=1), the sign bit of Word #2 is positive (S2=0) and there is no carry condition. Under these conditions the sign bit of Word #3 is negative (S3=1). An example of such conditions occurs when Word #1 has a value of −5, Word #2 has a value of −4 and the resultant word (Word #3) has a value of −1.

The fourth situation is when the sign bit of Word #1 is negative (S1=1), the sign bit for Word #2 is positive (S2=0), and a carry condition does occur. Under these conditions the sign bit of Word #3 is positive (S3=0). An example of such condition occurs when Word #1 has a value of −4, Word #2 has a value of +5 and the resultant word (Word #3) has a value of +1.

The Boolean logic expression for this arrangement is S3=S1. $\overline{CARRY}$ +S2. CARRY. This Boolean expression is implemented by AND gates 341 and 342, and OR gate 343. AND gate 341 provides a logic level 1 signal when a logic level 1 signal appears on the $\overline{CARRY}$ and S1 leads. Similarly, AND gate 342 provides a logic level 1 signal when a signal appears on the CARRY and S2 leads. Therefore, OR gate 343 provides a logic level 1 signal on lead S3 when logic level 1 signals appear on the S1 and CARRY leads or the S2 and $\overline{CARRY}$ leads.

Figure 4:
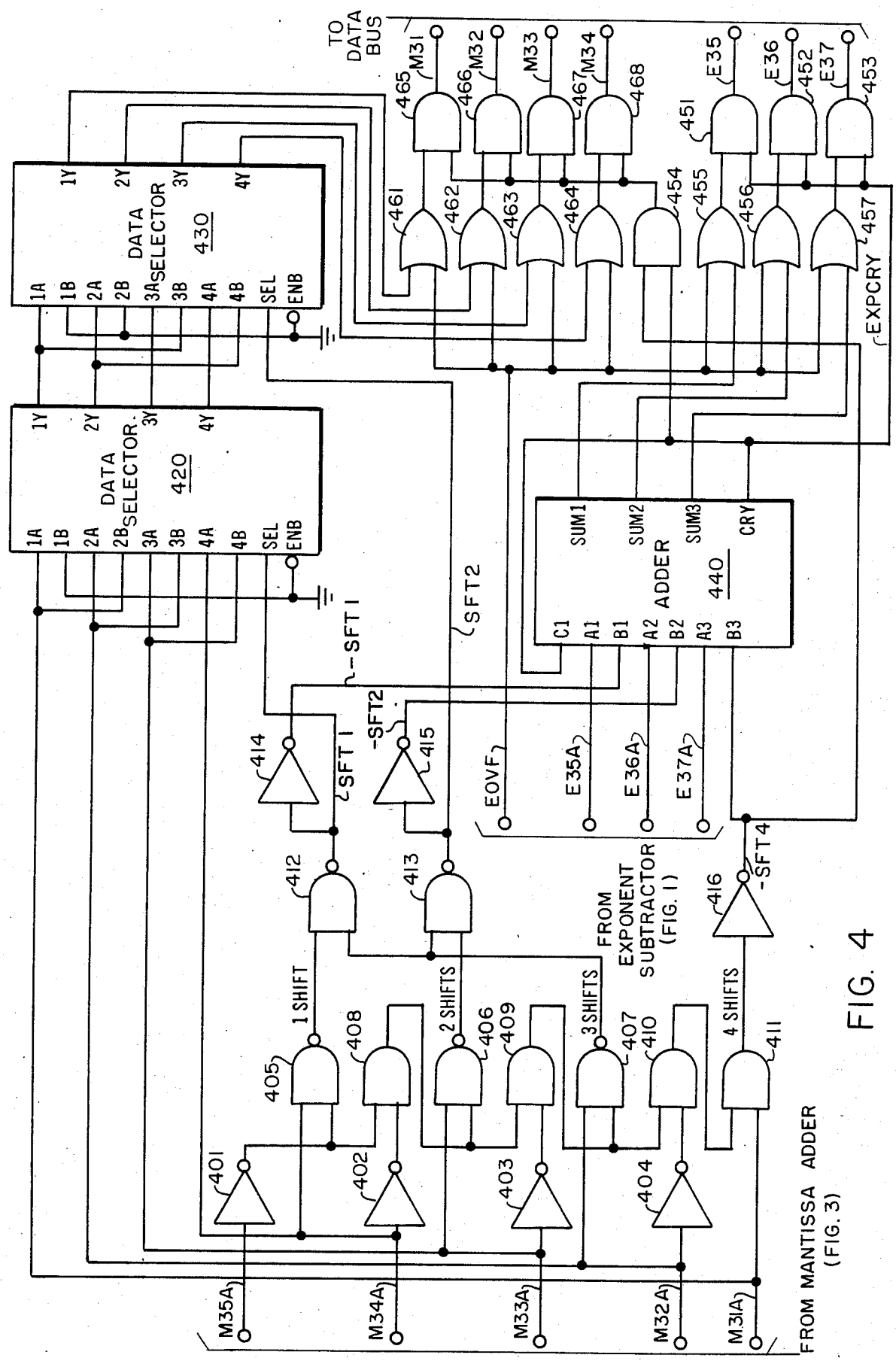
FIG. 4 of the accompanying drawing is a logic diagram of the normalizer circuit of the present invention.

Referring now to FIG. 4 the normalizer circuit of the present invention is shown. This circuit includes inverters 401-404 which are connected to the mantissa adder via leads M35A-M32A, respectively. NAND gates 405-407 are connected to the mantissa adder via leads M34A-M32A, respectively. NAND gate 405 is further connected to inverter 401 and NAND gate 406 is further connected to AND gate 408 which is connected to inverters 401 and 402. AND gate 409 is connected to AND gate 408 and to inverter 403 while NAND gate 407 is further connected to AND gate 409. AND gate 410 is connected to inverter 401 and to AND gate 409 while AND gate 411 is connected to AND gate 410 and to the mantissa adder via lead M31A. NAND gates 412 and 412 are connected to NAND gates 405 and 406, respectively, and to NAND gates 407. Inverters 414-416 are connected to NAND gates 412 and 413, and AND gate 411, respectively.

Data selector 420 includes inputs 1A-4A which are connected to the mantissa adder via leads M31A-M34A, respectively. This data selector also includes input 1B which is connected to ground and inputs 2B-4B which are connected to the mantissa adder via leads M31A-M33A, respectively. The select (SEL) input for this data selector is connected to NAND gate 412 via the SFT 1 lead. Data selector 430 includes inputs 1A-4A which are connected to outputs 1Y-4Y, respectively, of data selector 420. Inputs 1B and 2B of data selector 430 are connected to ground while inputs 3B and 4B are connected to outputs 1Y and 2Y, respectively, of data selector 420. The select (SEL) input of data selector 430 is connected to NAND gate 413 via the SFT 2 lead.

Adder 440 includes inputs A1-A3 which are connected to the exponent subtractor and selector circuit via leads E35A-E37A, respectively. This adder also includes inputs B1, B2 and B3 which are connected via leads −SFT 1, −SFT 2 and −SFT 4 to inverters 414, 415 and 416, respectively. The carry (C1) input of this adder is connected to its carry (CRY) output. This output is further connected to AND gates 451-454 via the exponent carry (EXPCRY) lead. The SUM1-SUM3 outputs of adder 440 are connected to OR gates 455-457, respectively. These OR gates are further connected to the exponent subtractor via the exponent overflow (EOVF) lead. OR gates 461-464 are also connected to the exponent subtractor via the EOVF lead. The outputs of OR gates 455-457 are connected to AND gates 451-453, respectively. The outputs of these AND gates are connected to the CPU via leads E35--E37, Respectively.

OR gates 461-464 are furter connected to outputs 1Y-4Y of data selector 430. AND gates 465-468 are connected to OR gates 461-464, respectively, and these AND gates are further connected to AND gate 454. The outputs of AND gates 465-468 are connected to the data bus via leads M31-M34.

When a subtraction operation is performed (S1=1, S2=0, or S1=0 and S2=1), it is possible that the implied mantissa bit (M35) will disappear. For example, if the mantissa of Word #2 equals 1.0111 and the mantissa of Word #1 after shifting equals 0.1000, the result after subtraction of Word #1 from Word #2 equals 0.1111. Thus the numeral 1 in the implied bit position, before the binary point, has disappeared. In order to put the numeral 1 back into the implied bit position, a single left shift must be performed on the output signals from the mantissa adder circuit.

However, in an extreme case, e.g. where the subtraction result is 0.0001, a shift of four bits must be performed. Any required shift of greater than four will result in the mantissa bits M34–M31 being 0. Thus, in any case, the value of the implied bit must be determined. If it is 0, the value of the bits in the next lower bit positions must be interrogated until a bit position having a value of 1 is located. The corresponding required number of shifts is then made to place a value of 1 in the implied bit position.

NAND gate 405 provides a logic level 0 "1SHIFT" control signal in response to detection of a logic level 0 signal in the implied bit position (M35A), as inverted by inverter 401, and a logic level 1 signal in the second fractional mantissa bit position (M34A).

AND gate 408 provides a logic level 1 signal when it detects logic level 0 signals in both the implied bit position (M35A) and the second fractional bit position (M34A), as inverted by inverters 401 and 402. NAND gate 406 then provides a "2SHIFTS" control signal in response to detection of a logic level 1 signal in the third fractional bit position (M33A) and logic level 0 signals in the more significant bit positions (M35A and M34A). The M35A and M34A logic level 0 signals are represented by the logic level 1 signal from AND gate 408.

AND gate 409 provides a logic level 1 signal when it detects logic level 0 signals in the implied bit position (M35A) and the next two fractional mantissa bit positions (M34A and M33A). The logic level 1 signal from AND gate 408 represents the M35A and M34A logic level 0 signals. The M33A logic level 0 signal is inverted by inverter 403 and then applied to AND gate 409. NAND gate 407 then provides a "3SHIFTS" control signal in response to detection of a logic level 1 signal in the third fractional mantissa bit position (M32A) and logic level signals in the preceding more significant bit positions. These logic level 0 signals are represented by the logic level 1 signal from AND gate 409.

AND gate 410 provides a logic level 1 signal in response to detection of logic level 0 signals in the implied bit position (M35A) and the next three fractional mantissa bit positions (M34A–M32A). The logic level 1 signal from AND gate 409 represents the M35A, M34A and M33A logic level 0 signals. The M32A logic level 0 signal is inverted by inverter 404 and then applied to AND gate 410. AND gate 411 then provides a "4SHIFTS" control signal in response to detection of logic level 1 signal in the least significant fractional mantissa bit position (M31A) and logic level 0 signals in the preceding more significant bit positions. These logic level 0 signals are represented by the logic level 1 signal from AND gate 410.

The "3SHIFTS" control signal from NAND gate 407 also appears at the inputs of NAND gates 412 and 413 causing them each to provide logic level 1 shift signals on the SFT1 and SFT2 leads, respectively. Alternatively, these NAND gates provide their corresponding shift signals in response to logic level 0 "1SHIFT" and "2SHIFTS" control signals from NAND gates 405 and 406, respectively. The signals on these SFT1 and SFT2 leads then appear at the select (SEL) inputs of data selectors 420 and 430, respectively. Inverters 414, 415 and 416 provide inverted logic level 0 shift signals on the −SFT1, −SFT2 and −SFT4 leads in response to the "1SHIFT", "2SHIFTS" and "4SHIFTS" control signals, respectively. The signals on these −SFT1, −SFT2 and −SFT4 leads then appear at the B1, B2 and B3 inputs of adder 440, respectively.

The actual bit shifting is performed by the two stage data selectors 420 and 430. When a logic level 1 single shift signal appears at the select (SEL) input of data selector 420 via the SFT1 lead, the signals appearing at inputs 1B–4B are selected and gated to the 1Y–4Y outputs. Under this arrangement a logic level 0 signal is inserted in the 1Y position since input 1B is connected to ground. Also, the signals on the M31A–M33A leads are shifted to the 2Y–4Y outputs since these signals appear at the 2B–4B inputs rather than the 1A–3A inputs. If a logic level 0 signal appears at the select (SEL) input of data selector 420 then the signals appearing at the 1A–4A inputs are gated directly to the 1Y–4Y outputs and no shifting occurs.

Similarly, the signals at the 1Y–4Y outputs of data selector 420 appear at the 1A–4A inputs of data selector 430. If a logic level 1 double shift signal appears at the select (SEL) input of data selector 430 via the SFT2 lead, the signals appearing at the 1B–4B inputs are gated to the 1Y–4Y outputs. Consequently, logic level 0 signals appear at both the 1Y and 2Y outputs since the 1B and 2B inputs are connected to ground. Also, the signals appearing at the 1Y and 2Y outputs of data selector 420 are shifted to the 3Y and 4Y outputs of data selector 430 since these signals appear at the 3B and 4B inputs rather than at the 1A and 2A inputs of data selector 430. Thus, a two bit position shift results. Alternatively, if a logic level 0 signal appears at the select (SEL) input of data selector 430 then the signals appearing at the 1Y–4Y outputs of data selector 420 are gated directly to the 1Y–4Y outputs of data selector 430 and no shifting occurs.

If it is required that the mantissa be shifted by three bit positions, then logic level 1 signals appear on the select (SEL) inputs of both data selectors. If it is required that the mantissa be shifted by four or more bit positions then zeros would be inserted in all mantissa bit positions (M31–M34). Such a condition occurs when a logic level 0 signal appears on the −SFT4 lead. AND gate 454 detects this logic level 0 signal and applies a logic level 0 signal to AND gates 465–468 which then apply logic level 0 signals to the M31–M34 leads. The implied bit is not provided with the mantissa bits M31–M34 but this implied bit is assumed to have a value of 1 so that the output mantissa has the minimum value of 1.000, as required.

If a number of mantissa bit shifts are required due to the normalization process, then the exponent E35–E37 must be reduced by the same amount. Such exponent reduction is performed by adder 440. Since the mantissa bits are shifted into higher order positions in the normalization process, the exponent must be adjusted by subtracting a value representative of the number of shifted mantissa bit positions. This subtraction process is again carried out by one's complement addition. Thus the inverted shift control signals on leads −SFT1, −SFT2 and −SFT4 appear at the B1, B2 and B3 inputs, respectively, of adder 440. This adder then adds the value representative of the shifted bit positions to the exponent values appearing on leads E35A-E37A. Any carry signal is again applied to the C1 input and added with the other inputs.

If the number to be subtracted from the exponent bits on leads E35A-E37A is larger than the value represented by those bits then the one's complement addition process provides no carry signal at output CRY. In this case, the minimum possible number is substituted for both the output exponent and mantissa. This result is achieved when the logic level 0 exponent carry (EXPCRY) signal appears at the CRY output causing AND gates 451-453 to provide logic level 0 signals on the exponent output leads E35-E37. This logic level 0 exponent carry signal also appears at the input of AND gate 454 causing it to apply a logic level 0 signal to AND gates 465-468 which then apply logic level 0 signals to the output mantissa leads M31-M34. Thus, the minimum value of 0s in both the exponent and mantissa results, except for a value of 1 in the implied bit position.

If a logic level 1 exponent carry signal results, then the exponent bits appering at outputs SUM1-SUM3 of adder 440 are gated via OR gates 455-457 and AND gates 451-453 to the exponent output leads E35-E37. Also when a logic level 1 exponent carry signal occurs and there are less than four shifts to be made, as indicated by a logic level 1 signal on the −SFT4 lead, AND gate 454 enables AND gates 465-468 to gate the mantissa bits from the 1Y-4Y outputs of data selector 430 via OR gates 461-464.

An additional condition causing adjustment of the exponent and mantissa bit occurs when there is an exponent overflow (EOVF). Under this condition, the exponent subtractor and selector circuit of FIG. 1 applies a logic level 1 signal to OR gates 461-464 and 455-457 via the EOVF lead. When there is such an exponent overflow, adder 440 also generates an exponent carry signal. Therefore, logic level 1 signals enable AND gates 465-468 and 451-453. The exponent overflow signal causes OR gates 461-464 and 455-457 to apply logic level 1 signals to the other inputs of these AND gates. AND gates 465-468 then apply logic level 1 signals to the mantissa output leads M31-M34 and AND gates 451-453 apply logic level 1 signals to the exponent output leads E35-E37.

Thus the adder circuit of the present invention adds two D2 encoded PCM samples directly rather than first converting them to linear coded samples, then performing the addition or subtraction operations and then reconverting the results to D2 encoded PCM samples. The exponent subtractor circuit determines the difference in the exponents of the two samples and selects the larger for the resultant exponent. The mantissa of the other sample is then shifted accordingly by the mantissa shifter circuit and the shifted and nonshifted mantissas are then added or subtracted by the mantissa adder circuit. The sign generator circuit provides the proper sign bit for the resultant and the normalizer circuit adjusts the output to be within a predetermined minimum and maximum range.

It will be obvious to those skilled in the art that numerous modifications of the present invention can be made without departing from the spirit of the invention which shall be limited only by the scope of the claims appended hereto.

What is claimed is:

1. An adder circuit for use in a digital sign processing system which includes a source of pulse code modulation (PCM) samples, each sample having sign, exponent and mantissa fields, said adder circuit comprising:
an exponent subtractor circuit, connected to said source of PCM samples, and operative to select one of said exponents from a pair of PCM samples, to provide signals representative of the difference in value of said exponents, and to provide signals identifying the selected exponent,
a mantissa shifter circuit, connected to said source of PCM samples and to said exponent subtractor circuit, and operative in response to said signals identifying the selected exponent to shift the mantissa associated with the other exponent by a number of bit positions equal to said difference in exponent values, whereby the mantissa of one sample is adjusted to reflect an exponent of the same value as the selected exponent;
a mantissa adder circuit comprising,
a sign bit exclusive-OR gate connected to said source of PCM samples and operative in response to sign bits of the same value, from each of a sample pair, to provide a summation signal representative of the sum of said shifted mantissa and the mantissa associated with the selected exponent; and
further operative in response to sign bits, of different values from each of a sample pair to provide a difference signal representative of the difference between said shifted mantissa and the mantissa associated with the selected exponent,
a first plurality of exclusive-OR gates connected to said mantissa shifter circuit and to said sign bit exclusive-OR gate;
a binary adder connected to said plurality of exclusive-OR gates and to said mantissa shifter circuit;
said plurality of exclusive-OR gates being operative in response to said sign control signal of a first or second characteristic to gate or invert mantissa bits associated with one of said pair of PCM samples to said mantissa adder circuit;
said binary adder being operative to add said gated or inverted bits from said plurality of exclusive-OR gates to mantissa bits associated with the other of said pair of PCM samples, whereby the mantissas of said samples are added to or subtracted from each other depending on the value of their associated sign bits, after being adjusted to reflect a common exponent;
said binary added further operative to provide addition signals representative of the results of said add operation, and carry signals of first and second characteristics, indicating the presence and absence, respectively, of a carry condition during said add operations;
a sign bit generator connected to said source of PCM samples and said mantissa adder circuit comprising,
first and second AND gates, each having a first input connected to said source of PCM samples, and a second input connected to said binary adder;
said first AND gate being operative in response to said sign bit of a first value from one of said PCM samples and said carry signal of a first characteristic to provide a first gate signal;
said second AND gate being operative in response to said sign bit of a second value from the other of said PCM samples and said carry signal of a second characteristic to provide a second gate signal; and
an OR gate connected to said first and second AND gates, and operative in response to said first or second gate signal to provide an output sign bit of a value representative of the results of said add operation.

2. An adder circuit as claimed in claim 1, wherein there is further included:
a normalizer circuit connected to said mantissa adder circuit and operative to provide a resultant mantissa by shifting said summation or difference signals until a predetermined minimum value results, and to provide a resultant exponent by adjusting said selected exponent by a number equal to the number bits said summation or difference signals were shifted.

3. An adder circuit as claimed in claim 2, wherein said normalizer circuit comprises:
bit position interrogating means connected to said mantissa adder circuit and operative to provide shift signals representative of the number of shifts required to provide said summation or difference signals of said predetermined minimum value;
a data selector connected to said mantissa adder circuit and said bit position interrogating means, and operative in response to said shift signals to provide said resultant mantissa by shifting said summation or difference signals by the indicated number of bit positions; and
an exponent adder circuit connected to said exponent subtractor circuit and said bit position interrogating means and operative to provide said resultant exponent by subtracting said shift signals from said selected exponent.

4. An adder circuit as claimed in claim 1, wherein said exponent subtractor circuit comprises:
an exponent adder connected to said source of PCM samples and operative to provide said signals representative of the difference in values of said exponents; and
a data selector connected to said source of PCM samples and to said exponent adder, and operative to select the larger exponent as a resultant exponent, by gating the first or second exponent from said pair of PCM samples, in response to first or second predetermined patterns of said signals from said exponent adder, respectively.

5. An adder circuit as claimed in claim 4, wherein the exponent bits associated with the first of said pair of PCM samples is subtracted from the second of said pair.

6. An adder circuit as claimed in claim 1, wherein said mantissa shifter circuit comprises:
first and second bit shifters, each connected to said source of PCM samples and to said exponent subtractor, and each operative in response to predetermined patterns of signals representative of the difference in values of said exponents to shift an associated mantissa by a number of bits indicated by said signals representative of the difference in values of said exponents.

7. An adder circuit as claimed in claim 5, wherein said first and second bit shifters each comprise a three stage data selector.

8. An adder circuit as claimed in claim 1, wherein said first AND gate is operative in response to said sign bit from the second of said pair of PCM samples and said second AND gate is operative in response to said sign bit from the first of said pair of PCM samples.

9. An adder circuit as claimed in claim 1, wherein the selected exponent is the larger exponent.

10. An adder circuit as claimed in claim 1, wherein the mantissa bits associated with the first of said pair of PCM samples is gated or inverted, whereby the first of said pair is subtracted from or added to the second of said pair.

* * * * *